United States Patent
Shibata et al.

(10) Patent No.: US 11,446,967 B2
(45) Date of Patent: Sep. 20, 2022

(54) PNEUMATIC TIRE

(71) Applicant: BRIDGESTONE CORPORATION, Tokyo (JP)

(72) Inventors: Masanao Shibata, Tokyo (JP); Jun Watanabe, Kokubunji (JP); Shin Sukegawa, Tokyo (JP); Takayuki Ohara, Tokyo (JP); Suguru Yamaguchi, Kawasaki (JP); Hiroki Hori, Tokyo (JP); Sho Mitsuda, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 225 days.

(21) Appl. No.: 16/631,258

(22) PCT Filed: Jun. 27, 2018

(86) PCT No.: PCT/JP2018/024441
§ 371 (c)(1),
(2) Date: Jan. 15, 2020

(87) PCT Pub. No.: WO2019/021730
PCT Pub. Date: Jan. 31, 2019

(65) Prior Publication Data
US 2020/0215858 A1    Jul. 9, 2020

(30) Foreign Application Priority Data
Jul. 24, 2017  (JP) .............................. JP2017-143043

(51) Int. Cl.
*B60C 19/00*  (2006.01)
*B60C 23/04*  (2006.01)
(Continued)

(52) U.S. Cl.
CPC ............ *B60C 19/002* (2013.01); *B60C 19/00* (2013.01); *B60C 23/00* (2013.01);
(Continued)

(58) Field of Classification Search
CPC . B60C 19/002; B60C 19/00; B60C 2019/004; B60C 23/0491; B60C 23/0493
(Continued)

(56) References Cited

U.S. PATENT DOCUMENTS 5,573,611 A   11/1996  Koch et al.
9,180,741 B2  11/2015  Oba
(Continued)

FOREIGN PATENT DOCUMENTS

CN       103153651 A        6/2013
DE    102005023974 A1 *   11/2006   ......... B60C 23/0493
(Continued)

OTHER PUBLICATIONS

Strzelczyk, English Machine Translation of DE 102007001279, 2008 (Year: 2008).*
(Continued)

*Primary Examiner* — Robert C Dye
*Assistant Examiner* — Brendon Charles Darby
(74) *Attorney, Agent, or Firm* — Kenja IP Law PC

(57) ABSTRACT

A pneumatic tire in accordance with the present disclosure comprises a first sound damper fixed to a tire inner surface and being made of a sponge material; a second sound damper disposed on a tire internal space side of the first sound damper, and being made of a sponge material; and a communication device retained between the first sound damper and the second sound damper, wherein the second sound damper has a hardness greater than a hardness of the first sound damper.

20 Claims, 9 Drawing Sheets

(51) Int. Cl.
  *B60C 23/00* (2006.01)
  *G06K 19/077* (2006.01)
(52) U.S. Cl.
  CPC .... *B60C 23/0493* (2013.01); *G06K 19/07728* (2013.01); *G06K 19/07764* (2013.01); *B60C 2019/004* (2013.01)
(58) Field of Classification Search
  USPC ...................................................... 152/152.1
  See application file for complete search history.

(56) References Cited

U.S. PATENT DOCUMENTS

| | | | |
|---|---|---|---|
| 2006/0123899 A1* | 6/2006 | Nakao | B60C 23/0493 73/146 |
| 2007/0146124 A1 | 6/2007 | Shinmura | |
| 2007/0251620 A1 | 11/2007 | Perrier et al. | |
| 2008/0035259 A1 | 2/2008 | Mancosu et al. | |
| 2013/0133800 A1 | 5/2013 | Griffoin | |
| 2015/0020585 A1* | 1/2015 | Dussinger | B60C 23/0493 73/146.5 |

FOREIGN PATENT DOCUMENTS

| | | | | |
|---|---|---|---|---|
| DE | 102007001279 A1 * | 7/2008 | ......... | B60C 23/0493 |
| DE | 102015217479 A1 | 3/2017 | | |
| EP | 2067634 A1 | 6/2009 | | |
| JP | 2004276809 A | 10/2004 | | |
| JP | 3621899 B2 | 2/2005 | | |
| JP | 2007176403 A | 7/2007 | | |
| JP | 2007290699 A | 11/2007 | | |
| JP | 2009137497 A | 6/2009 | | |
| JP | 2010125920 A | 6/2010 | | |
| JP | 2010179888 A | 8/2010 | | |
| JP | 2013112342 A | 6/2013 | | |

OTHER PUBLICATIONS

Komischke, English Machine Translation of DE 102005023974, 2006 (Year: 2006).*

Jan. 28, 2020, International Preliminary Report on Patentability issued in the International Patent Application No. PCT/JP2018/024441.

Feb. 23, 2021, search result of the Extended European Search Report issued by the European Patent Office in the corresponding European Patent Application No. 18838366.5.

Sep. 25, 2018, International Search Report issued in the International Patent Application No. PCT/JP2018/024441.

Jun. 2, 2021, search result of Office Action issued by the China National Intellectual Property Administration in the corresponding Chinese Patent Application No. 201880048768.2.

Feb. 15, 2022, search result of Office Action issued by the China National Intellectual Property Administration in the corresponding Chinese Patent Application No. 201880048768.2.

* cited by examiner

PNEUMATIC TIRE

TECHNICAL FIELD

The present disclosure relates to a pneumatic tire.

BACKGROUND

Configurations have been conventionally known which have, attached to tire inner surfaces or embedded in tires, communication devices, such as a sensor for detecting internal statuses of the tire (e.g., the air pressure of the tire) or an RF tag having a storage unit capable of storing unique identification information of the tire. For example, the statuses of tires during driving can be determined by a sensor serving as a communication device, or information of the tires retrieved from a storage unit in an RF tag serving as a communication device may be utilized for maintenance service or other services.

PTL-1 discloses a configuration in which a radio tag is attached to a sponge material fixed to an inner surface of a tire. PTL-2 discloses a band-like sheet fixed to an inner surface of a tire, formed in a multilayered structure comprising a first layer composed of a first sponge material having an excellent sound absorption characteristic, and a second layer composed of a second sponge material having an excellent characteristic of preventing reflection of sounds.

CITATION LIST

Patent Literature

PTL-1: JP2007176403A
PTL-2: JP3621899B

SUMMARY

Technical Problem

As described in PTL-1 and PTL-2, a sponge material provided in a tire cavity defined by a pneumatic tire and a rim reduces cavity resonance by absorbing sounds by converting the energy of the sounds that may otherwise resonate inside the cavity into energy in other forms, for example. Furthermore, PTL-1 discloses protection of a radio tag serving as a communication device from impacts, vibrations, and the like, by means of a sponge material attached to the radio tag.

In the configuration disclosed in PTL-1, however, there still remains a risk that a radio tag may escape from the sponge material due to an impact, vibration, or the like during driving, and enter the tire cavity. Thus, it is desirable to improve securement of a radio tag by the sponge material. On the other hand, when the sponge material composed of a soft material is employed in an attempt to provide better protection of the radio tag from impacts, vibration, and the like, the sponge material is more susceptible to deformations under impacts, vibrations, airflows inside the tire cavity, and the like during driving. After undergoing repeated deformations, the sponge material is more likely to break into small pieces from its surface, and detached small pieces of the sponge material may spread within the tire cavity.

Accordingly, it could be helpful to provide a pneumatic tire that has a configuration capable of providing both an improvement in the securement of a communication device by a sponge material and an improved durability of the sponge material, in addition to protection of the communication device by the sponge material.

Solution to Problem

A pneumatic tire as one aspect of the present disclosure comprises a first sound damper fixed to a tire inner surface and being made of a sponge material; a second sound damper disposed on a tire internal space side of the first sound damper, and being made of a sponge material; and a communication device retained between the first sound damper and the second sound damper, wherein the second sound damper has a hardness greater than a hardness of the first sound damper.

Advantageous Effect

In accordance with the present disclosure, a pneumatic tire is provided which has a configuration capable of providing both an improvement in the securement of a communication device by a sponge material and an improved durability of the sponge material, in addition to protection of the communication device by the sponge material.

DETAILED DESCRIPTION

Figure 1:
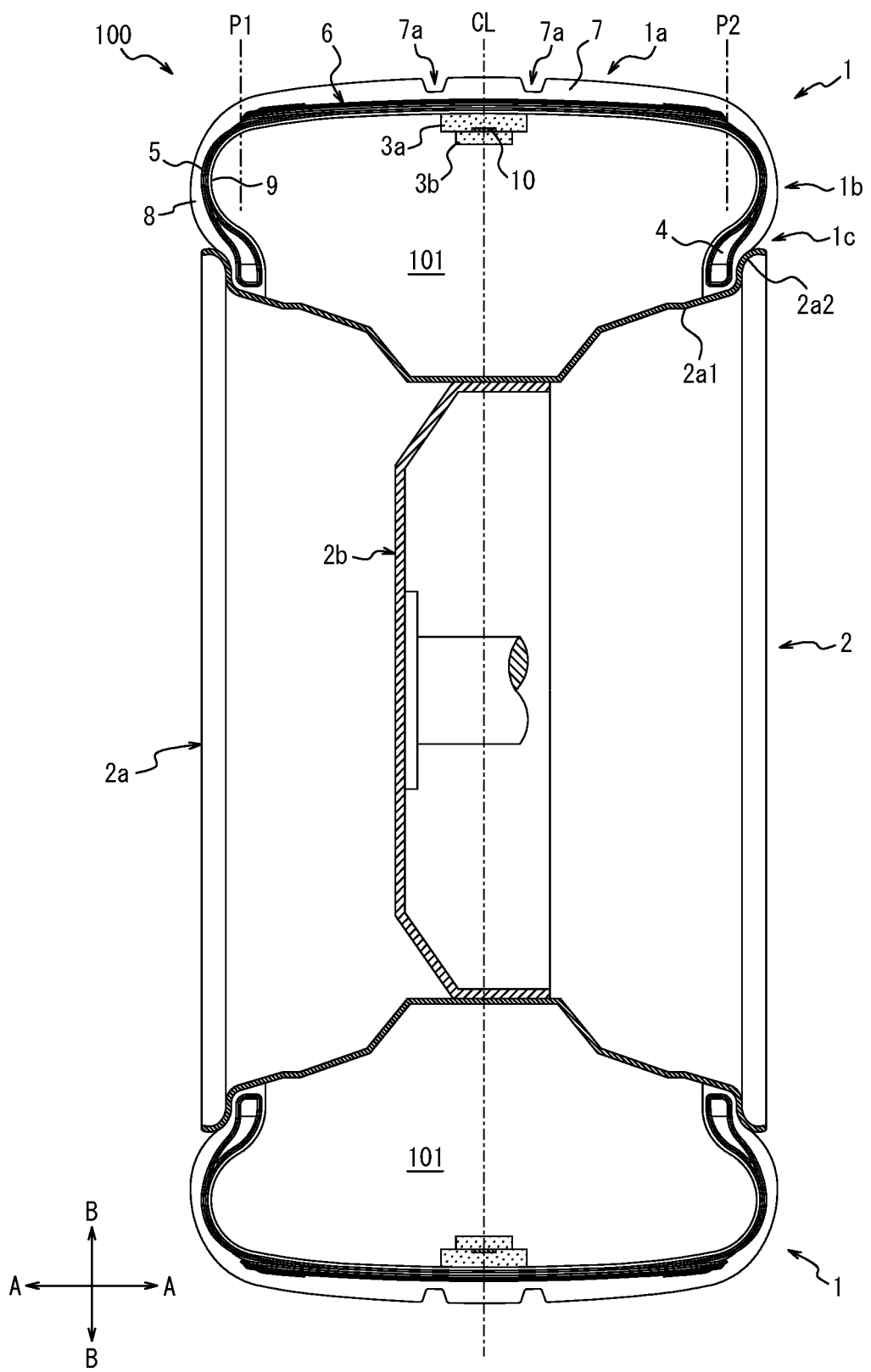
FIG. 1 is a cross-sectional diagram of a cross-section along the tire width direction of an assembly including a pneumatic tire as a first embodiment of the present disclosure.

Hereinafter, embodiments of a pneumatic tire according to the present disclosure will be exemplified and described with reference to FIGS. 1 to 10. In the drawings, the like members or positions are denoted by the same reference symbols.

First Embodiment

Figure 2:
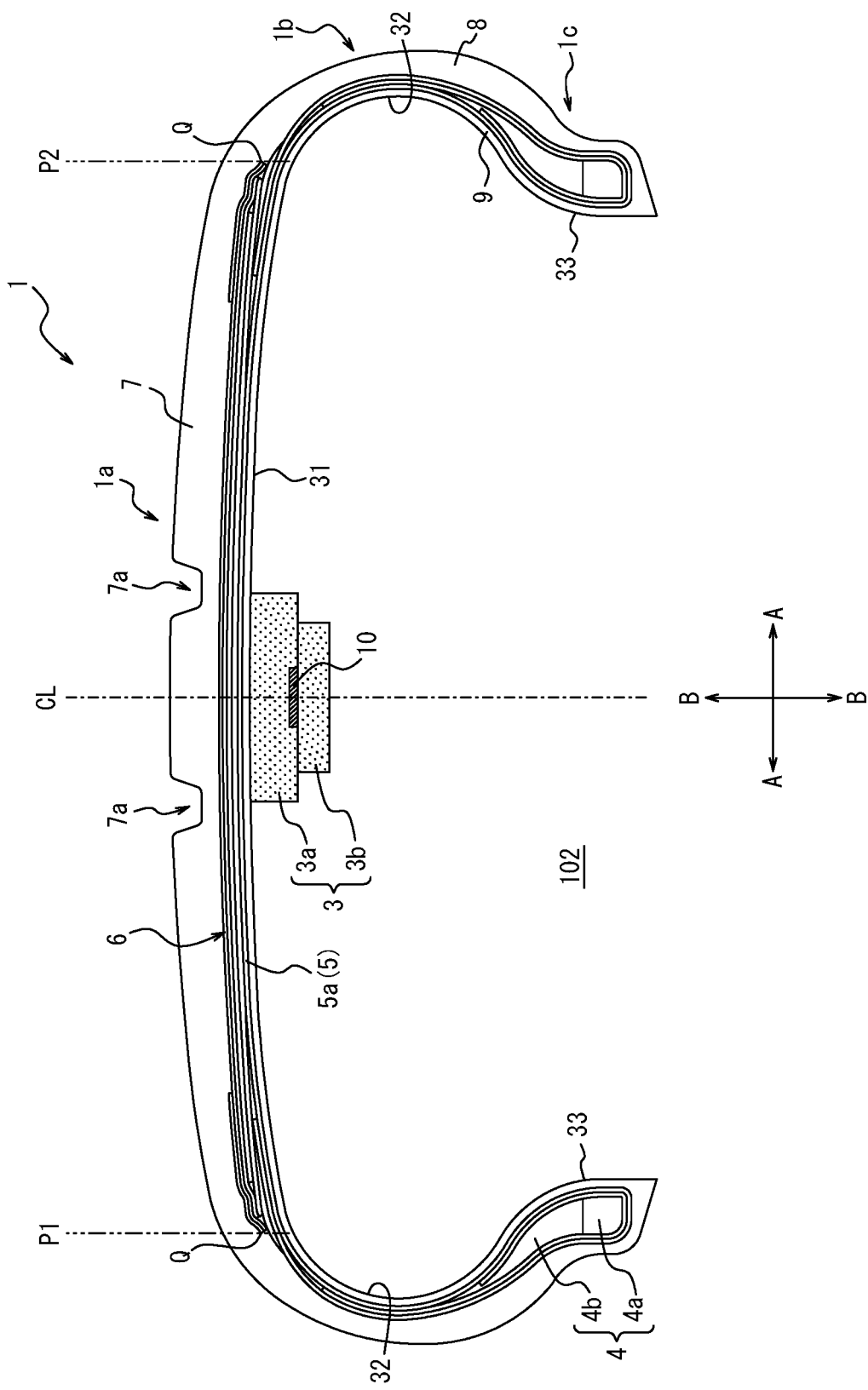
FIG. 2 is a tire widthwise cross-sectional diagram solely illustrating the pneumatic tire illustrated in FIG. 1.
Figure 3:
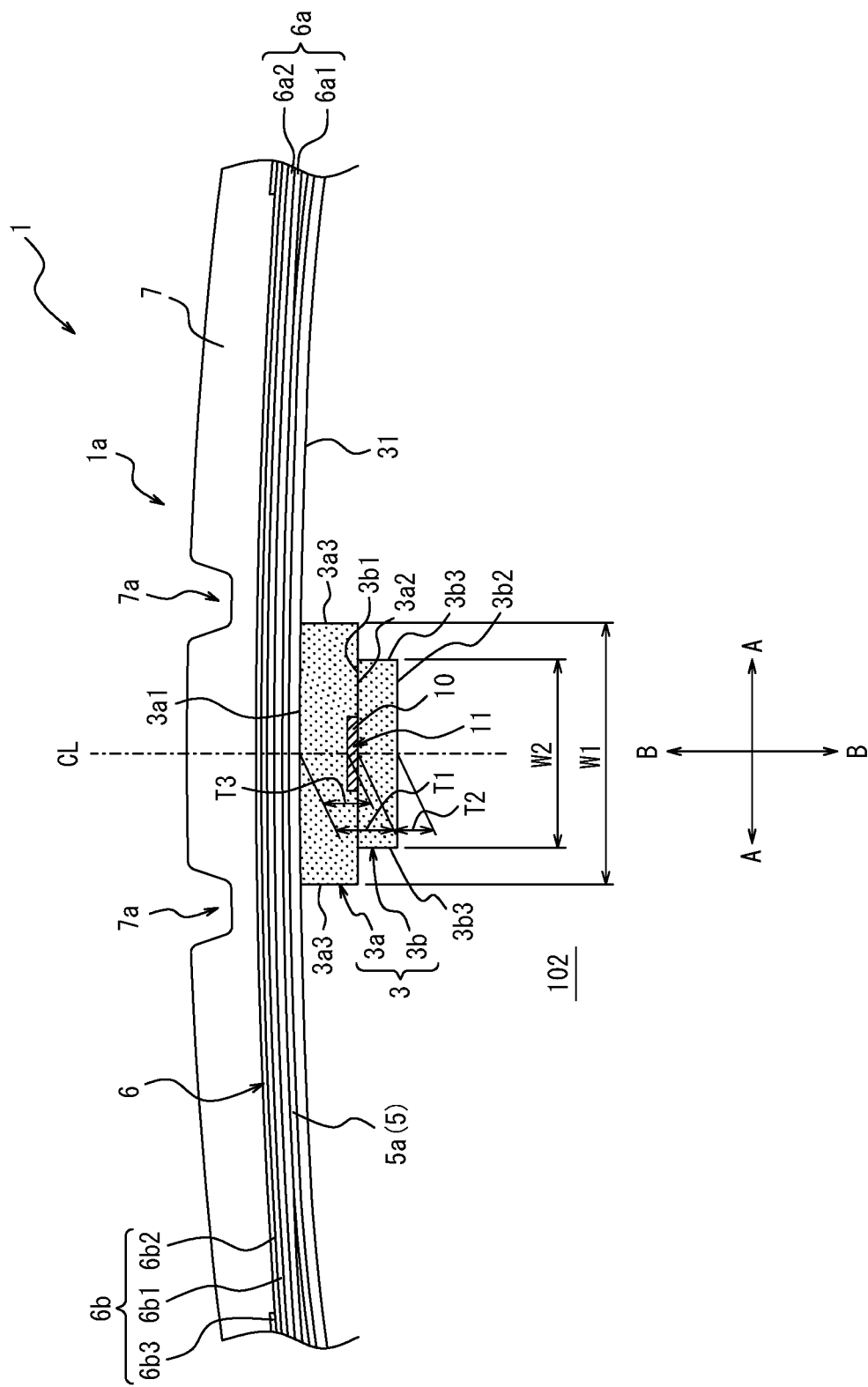
FIG. 3 is an enlarged cross-sectional diagram illustrating a tread of the pneumatic tire in FIG. 2 in an enlarged view.

FIG. 1 is a diagram illustrating an assembly 100 including a pneumatic tire 1 (hereinafter simply referred to as the "tire 1") and a rim 2. Specifically, FIG. 1 is a cross-sectional diagram illustrating a cross-section of the assembly 100 on a plane that encompasses the tire rotation axis and is parallel to the tire width direction A (hereinafter referred to as "tire widthwise cross-sectional diagram"). FIG. 2 is a tire widthwise cross-sectional diagram solely illustrating the tire 1 illustrated in FIG. 1. FIG. 3 is an enlarged cross-sectional illustrating a tread 1a that is a part of the tire 1 in FIG. 2 in an enlarged view. In other words, FIGS. 2 and 3 illustrate the tire 1 that is not mounted on the rim 2.

As illustrated in FIG. 1, the tire 1 is mounted on the rim 2 in the assembly 100. In the assembly 100, the tire cavity surface defined by the inner surface of the tire 1 (hereinafter referred to as the "tire inner surface") and the outer surface of the rim 2 (hereinafter referred to as "rim outer surface") define an annular tire cavity 101. As illustrated in FIG. 2, in a tire widthwise cross-sectional view, the space that is defined only by tire inner surface and is open on the inner side in the tire radial direction B is referred to as "tire internal space 102".

<Rim 2>

The rim 2 includes a rim main body 2a and a disc 2b. Beads 1c (described later) of the tire 1 are to be mounted on the rim main body 2a. The disc 2b supports the rim main body 2a, and the disc 2b is to be coupled to the axle of a vehicle. Although the rim 2 of the present embodiment is two-piece metal wheel rim, this is not limiting and the rim 2 may be a one-piece rim or may have any other configuration. The rim main body 2a includes a rim sheet 2a1 and rim flanges 2a2. Bead members 4 (described later) of the tire 1 are to be seated on outer sides of the rim sheet 2a1 in the tire radial direction B. The rim flanges 2a2 protrude outwardly in the tire radial direction B from the corresponding ends of the rim sheet 2a1 in the tire width direction A.

<Tire 1>

The tire 1 includes a tread 1a, a pair of side walls 1b extending inwardly in the tire radial direction B from corresponding ends of the tread 1a in the tire width direction A, and a pair of beads 1c provided at the respective ends of the side walls 1b on the inner side in the tire radial direction B. The tire 1 of the present embodiment is a tubeless radial tire for a passenger vehicle. As used herein, the term "tread 1a" refers to a section (except for the beads 1c) extending between two planes P1 and P2 that are parallel to the tire radial direction B, and intersects respective belt ends Q (see FIG. 2) located outermost of a belt 6 (described later) in the tire width direction A. The term "beads 1c" refers to sections where bead members 4 (described later) are disposed in the tire radial direction B. The term "side walls 1b" refers to the sections extending between the tread 1a and the respective beads 1c.

The tire inner surface defining the tire cavity 101 has an inner surface 31 of the tread 1a (hereinafter referred to as the "tread inner surface 31"), inner surfaces 32 of the side walls 1b (hereinafter referred to as the "side wall inner surfaces 32"), and inner surfaces 33 of the beads 1c (hereinafter referred to as the "bead inner surfaces 33").

The tire 1 includes a sound damper 3, bead members 4, a carcass 5, a belt 6, a tread rubber 7, side rubbers 8, an inner liner 9, and a communication device 10.

[Sound Damper 3]

The sound damper 3 includes a first sound damper 3a and a second sound damper 3b. The first sound damper 3a is made of a sponge material. The first sound damper 3a is fixed to the tire inner surface. The second sound damper 3b is made of a sponge material. The second sound damper 3b is disposed on the tire internal space 102 side of the first sound damper 3a (which is the same side as the tire cavity 101 side in the assembly 100 in FIG. 1). The first sound damper 3a and the second sound damper 3b made of the sponge materials provided on the tire cavity 101 can reduce cavity resonance inside the tire cavity 101.

As used herein, the term "tire internal space side of the first sound damper" refers to the side where the tire internal space resides relative to the first sound damper, and refers to not only the surface opposite to a fixed surface, which is fixed to the tire inner surface of the first sound damper. More specifically, in the present embodiment, the tire internal space 102 side of the first sound damper 3a includes the inner side of the first sound damper 3a in the tire radial direction B (the bottom side in FIG. 3) and the two sides of the first sound damper 3a in the tire width direction A (the left and right sides in FIG. 3), in the tire widthwise cross-sectional view illustrated in FIG. 3. Although the second sound damper 3b of the present embodiment is disposed inward relative to the first sound damper 3a in the tire radial direction B which represents the tire internal space 102 side of the first sound damper 3a, this configuration is not limiting. The second sound damper may be disposed on one or both of the sides of the first sound damper 3a in the tire width direction A as the tire internal space 102 side of the first sound damper 3a.

The second sound damper 3b has a hardness greater than a hardness of the first sound damper 3a. The "hardness" as used herein is defined as a value measured in accordance with the Method A in Section 6.4 of the test methods described in "Hardness Tests" in Section 6 of JIS K6400-2 (2012).

As will be described later, the communication device 10 is retained between the first sound damper 3a and the second sound damper 3b. The first sound damper 3a made of a soft sponge material absorbs impacts, vibration, and the like coming from the tire inner surface side of the tire 1, thereby preventing transmissions of the impacts and vibration to the communication device 10. On the other hand, the second sound damper 3b made of a hard sponge material prevents deformation of the second sound damper 3b due to impacts, vibrations, airflows inside the tire cavity, and the like during driving on the road surface. As a result, the sponge material becomes less likely to break into small pieces which are then detached from the surface of the second sound damper 3b. In other words, the second sound damper 3b made of a sponge material that has a hardness greater than that of the sponge material of the first sound damper 3a can improve the durability of the second sound damper 3b as compared to a configuration in which the second sound damper is made of the same sponge material as or a softer sponge material than that of the first sound damper 3a. Furthermore, because the communication device 10 is retained between the first sound damper 3a and the second sound damper 3b, the second sound damper 3b serves as a cover so that the communication device 10 is less likely to be detached and enter the tire internal space 102. This can improve the securement of the communication device 10.

In this manner, the aforementioned hardness relationship of the hardnesses of the first sound damper 3a and the second sound damper 3b and the configuration in which the communication device 10 is retained between the first sound damper 3a and the second sound damper 3b can provide both an improved securement of the communication device 10 by sponge materials and an improved durability of the sponge materials, in addition to protection of the communication device 10 by the sponge materials.

The hardnesses of the first sound damper 3a and the second sound damper 3b made of the sponge materials preferably range from 25 N to 55 N and satisfy the hardness relationship described above. Particularly, the hardness of the first sound damper 3a preferably ranges from 30 N to 50 N. The hardness of the second sound damper 3b preferably ranges from 35 N to 45 N.

The sponge materials composing the first sound damper 3a and the second sound damper 3b are spongy porous structures, and include so-called sponge of a foamed rubber or synthetic resin with open cells, for example. In addition to the sponge described above, the sponge materials include a web-like material in which animal fibers, plant fibers, synthetic fibers, or the like are intertwined to form an integral structure. Note that the "porous structures" described above are not limited to structures with open cells, and include structures with closed cells. In terms of the sound absorption characteristic, however, structures with open cells are preferable.

Sponge materials as described above have voids formed thereon or therein, and the voids absorb sounds by converting vibration energies of the air vibrations into thermal energies. This reduces cavity resonance inside the tire cavity.

Examples of the material of the sponge materials include synthetic resin sponges, such as an ether-based polyurethane sponge, an ester-based polyurethane sponge, and a polyethylene sponge; and rubber sponges such as a chloroprene rubber sponge (CR sponge), an ethylene propylene rubber sponge (EPDM sponge), and a nitrile rubber sponge (NBR sponge), for example. In terms of properties, including the sound damping characteristic, light weight, the adjustability of foaming, and the durability, polyurethane-based sponges, including an ether-based polyurethane sponge, or polyethylene-based sponges are preferably used.

The specific gravity of the sponge materials preferably ranges from 0.005 to 0.06, more preferably from 0.01 to 0.04, and even more preferably from 0.01 to 0.03, in view of balancing an increase in the tire weight and the cavity resonance reduction effect.

Furthermore, the volume of the sound damper 3, which is the sum of the volumes of the first sound damper 3a and the second sound damper 3b, is preferably 0.4% to 20% of the total volume of the tire cavity 101. The volume of the sound damper 3 of 0.4% or more relative to the total volume of the tire cavity helps to achieve a desired cavity resonance reduction effect (e.g., a reduction of 2 dB or higher). The volume of the sound damper 3 is more preferably 1% or more, even more preferably 2% or more, and particularly preferably 4% or more of the total volume of the tire cavity 101. On the other hand, the volume of the sound damper 3 exceeding 20% of the total volume of the tire cavity 101 does not satisfactorily improve the cavity resonance reduction effect. Rather, the weight balance of the assembly 100 may be compromised. From such a perspective, the volume of the sound damper 3 is more preferably 16% or less and even more preferably 10% or less of the total volume of the tire cavity 101. Further details of the first sound damper 3a and the second sound damper 3b will be described late.

[Bead Member 4]

The bead members 4 are embedded in the corresponding beads 1c. Each bead member 4 includes a bead core 4a and a bead filler 4b that is made of a rubber and is located outward relative to the bead core 4a in the tire radial direction B. The bead core 4a includes a plurality of bead wires, each bead wire being coated with a rubber. The bead wires are formed from steel cords. The steel cords may be composed of steel monofilaments or twisted wires, for example. Alternatively, other materials, such as organic fibers or carbon fibers, may also be used as the bead wires.

[Carcass 5]

The carcass 5 spans across the pair of beads 1c, more specifically, across the bead cores 4a of the pair of bead members 4, and extends toroidally. The carcass 5 has at least a radial structure.

Figure 7:
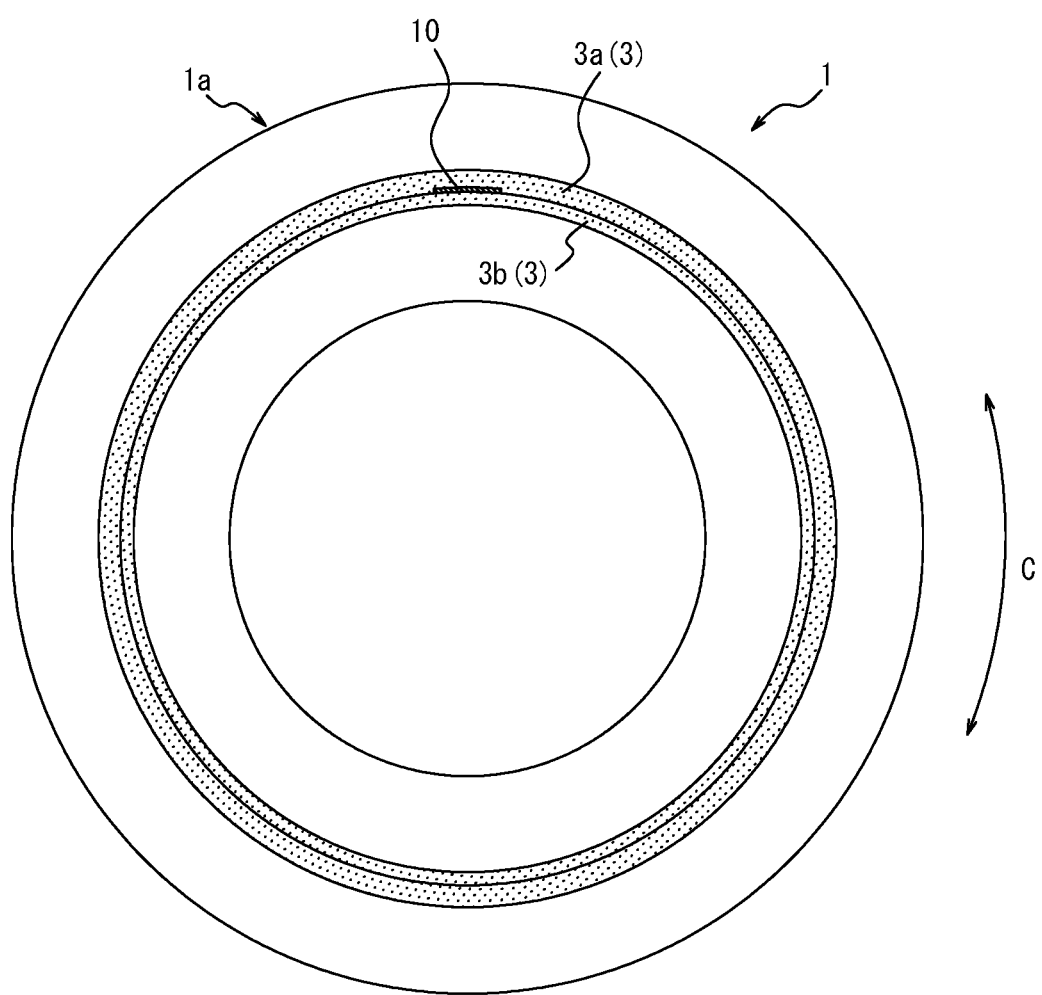
FIG. 7 is a tire circumferential cross-sectional diagram solely illustrating the pneumatic tire illustrated in FIG. 1.

The carcass 5 is constructed from one or more (one in this embodiment) carcass plies 5a, and each carcass ply is composed from carcass cords that are arranged at angles of, for example, 75° to 90° with respect to the tire circumferential direction C (see FIG. 7). The carcass ply 5a includes a ply main body extending between the pair of bead cores 4a and carcass folds, each carcass fold extending from the ply main body and being folded around the corresponding bead core 4a from the inner side toward the outer side in the tire radial direction A. Between the ply main body and each ply fold, a bead filler 4b extends outward from the bead core 4a in the tire radial direction B in a tapered shape. Although polyester cords are employed as the carcass cords composing the carcass ply 5a in the present embodiment, organic fiber cords of nylon, rayon, aramid, or the like may be employed and even steel cords may also be employed as required. In addition, two or more carcass plies 5a may be provided.

[Belt 6]

The belt 6 includes one or more (five in this embodiment) belt layers disposed outward with respect to the crown of the carcass 5 in the tire radial direction B. Specifically, as illustrated in FIG. 3, the belt 6 of the present embodiment includes an inclined belt 6a and a circumferential belt 6b.

As illustrated in FIG. 3, the inclined belt 6a includes one or more (two in this embodiment) inclined belt layers disposed outward with respect to the crown of the carcass 5 in the tire radial direction B. More specifically, the inclined belts 6a of the present embodiment include a first inclined belt layer 6a1 and a second inclined belt layer 6a2, which are overlapped with one another in the tire radial direction B. Each of the first inclined belt layer 6a1 and the second inclined belt layer 6a2 is constituted from a belt ply composed of steel cords as metallic belt cords that are inclined at angles of 10° to 40° with respect to the tire circumferential direction C (see FIG. 7). The two belt plies are overlapped with one another such that their incline directions are different from each other. As a result, the belt cords of the belt plies cross each other, which enhances the rigidity of belts, thereby reinforcing the tread 1a substantially in the entire width thereof by the tagger effect. In the present embodiment, the second inclined belt layer 6a2 disposed outward in the tire radial direction B is formed narrower than the first inclined belt layer 6a1 disposed inward in the tire radial direction B. As a result, in the present embodiment, the first inclined belt layer 6a1 disposed inward in the tire radial direction B extends more outward in the tire width direction A than the second inclined belt layer 6a2 disposed outward in the tire radial direction B.

Alternatively, the first inclined belt layer disposed inward in the tire radial direction B may be formed narrower than the second inclined belt layer disposed outward in the tire radial direction B. In other words, the second inclined belt layer disposed outward in the tire radial direction B may extend more outward in the tire width direction A than the first inclined belt layer disposed inward in the tire radial direction B. The inclined belt 6a may be composed of only one belt layer, or may be composed of three or more belt layers.

As illustrated in FIG. 3, the circumferential belt 6b includes one or more (three in this embodiment) circumferential belt layers disposed outward with respect to the inclined belt 6a in the tire radial direction B. More specifically, the circumferential belt 6b includes a first circumferential belt layer 6b1, a second circumferential belt layer 6b2, and a third circumferential belt layer 6b3, which are overlapped with one another in the tire radial direction B. Each of the first circumferential belt layer 6b1, the second circumferential belt layer 6b2, and the third circumferential belt layer 6b3 is constituted from a belt ply that is composed of nylon cords as belt cords of organic fibers spirally wound about the rotation axis of the tire at an angle of 10° or less, preferably 5° or less with respect to the tire circumferential direction C (see FIG. 7).

While the circumferential belt 6b of the present embodiment is configured from the three circumferential belt layers disposed outward with respect to the inclined belt 6a in the tire radial direction B, this configuration is not limiting. The circumferential belt 6b may be a circumferential belt composed of less than three or more than more than three circumferential belt layers In addition, the length relationship of the lengths in the tire width direction A of the circumferential belt layers, the length relationship of the length in the tire width direction A of each circumferential belt layer and each inclined belt layer, the positional relationship of the positions of the belt ends of the circumferential belt layers, the positional relationship of the positions of the belt ends of each circumferential belt layer and each circumferential belt layer, and the like are not limited to those in the configuration of the present embodiment. They may be appropriately designed according to the desired characteristics, and are not limited to belt structures of the present embodiment.

[Tread Rubber 7 and Side Rubbers 8]

The tread rubber 7 defines the outer surface of the tread 1a in the tire radial direction B (hereinafter, referred to as a "tread outer surface"), and has a tread pattern including circumferential grooves 7a extending in the tire circumferential direction C (see FIG. 7) and widthwise grooves (not illustrated) extending in the tire width direction A, formed on the tread outer surface. The side rubbers 8 define the outer surfaces of the sidewall portion 1b in the tire width direction A and are formed integrally with the above tread rubber 7.

[Inner Liner 9]

The inner liner 9 is overlapped on the inner surface of the carcass 5, and is made of a butyl-based rubber having a low air permeability. Note that a "butyl-based rubber" refers to a butyl rubber and a halogenated derivative thereof, i.e., a halogenated butyl rubber. The first sound damper 3a is fixed to the inner liner 9 with a double-sided adhesive tape, an adhesive, or the like. For improving the adhesion, the region of the inner liner 9 to which the first sound damper 3a is fixed may be a formed as a low-butyl content region where the content of the butyl-based rubber is lower than that in the region to which the first sound damper 3a is not fixed.

[Communication Device 10]

Figure 4:
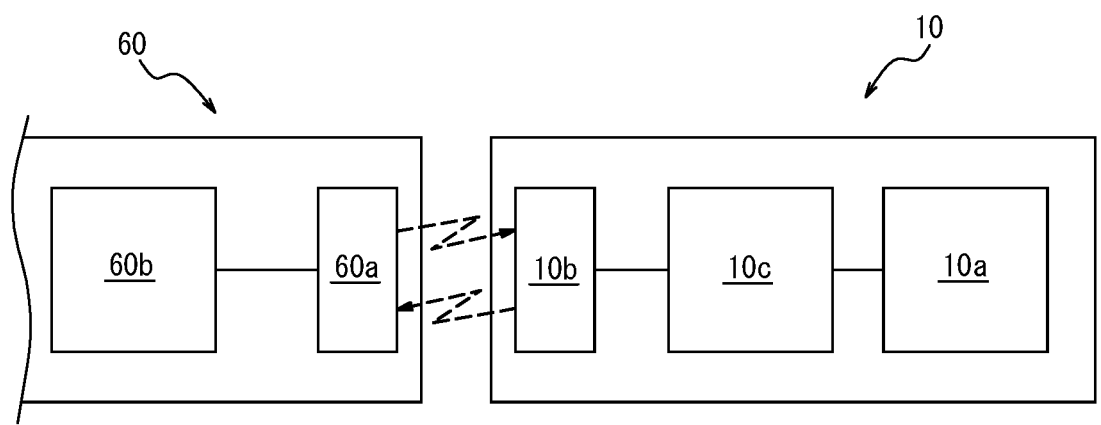
FIG. 4 is a diagram illustrating an RF tag as an example of a communication device, and a reader/writer wirelessly communicative with the RF tag.

The communication device 10 is retained between the first sound damper 3a and the second sound damper 3b. It is sufficient that the communication device 10 is configured to be wirelessly communicative with a certain device external to the tire 1, and the configuration of the communication device 10 is not particularly limited. FIG. 4 is a diagram illustrating an RF tag as an example of the communication device 10, and a reader/writer 60 that is wirelessly communicative with the RF tag. As illustrated in FIG. 4, the RF tag is preferably a passive RF tag that includes a storage unit 10a for storing identification information of the tire 1, an antenna unit 10b that can carry out transmissions and receptions with the reader/writer 60 external to the tire 1, and a control unit 10c that can write and read information to and from the storage unit 10a. Specifically, the RF tag serving as the communication device 10 can receive, at the antenna unit 10b, information transmitted by means of a radio wave or magnetic field from an antenna unit 60a of the reader/writer 60. Rectification (in the case of a radio wave) or resonation (in the case of a magnetic field) induces electric power in the antenna unit 10b of the RF tag, which causes the storage unit 10a and the control unit 10c to carry out predetermined operations. For example, the control unit 10c reads information in the storage unit 10a in the RF tag, and sends back (transmits) the information from the antenna unit 10b to the reader/writer 60 by means of a radio wave or magnetic field. The antenna unit 60a of the reader/writer 60 receives the radio wave or magnetic field from the RF tag. The control unit 60b in the reader/writer 60 can obtain the received information, thereby retrieving information stored in the storage unit 10a in the RF tag. The storage unit 10a and the control unit 10c may be configured from, for example, an integrated circuit (IC chip) having a nonvolatile memory.

The storage unit 10a in the RF tag serving as the communication device 10 stores unique identification information of the tire 1 for uniquely identifying the tire, such as the manufacturer, manufacturing plant, and manufacturing date of the tire 1, for example. The storage unit 10a may also store tire history information, such as the mileage traveled by the tire, and the numbers of sudden brakes, sudden starts, and sudden turns experienced by the tire, as information that is rewritable by the reader/writer 60. Furthermore, for example, sensors for detecting temperatures inside the tire, tire internal pressure, tire accelerations, and the like may be provided in the tire cavity 101, and the storage unit 10a may store detection information detected by these sensors. The RF tag serving as the communication device 10 can wirelessly communicate with the sensors via the antenna unit 10b, thereby obtaining information detected by the sensors.

As described above, it is sufficient that the communication device 10 is configured to be wirelessly communicative with a predetermined device external to the tire 1, and the communication device 10 may be, for example, an accelerometer for detecting the acceleration of the tire 1, an internal pressure sensor for detecting the internal pressure of the tire 1, or the like, instead of the RF tag described above. Still, the communication device 10 is preferably an RF tag which is not affected by distance factors such as the tire displacement amount per unit time, rather than a sensor, e.g., an accelerometer, whose measurement accuracy varies depending on distance factors. This is because a sensor whose measurement accuracy varies by the distant factor, e.g., an accelerometer, may not be able to carry out accurate measurements when the first sound damper 3a absorbs the displacement of the tire. On the other hand, the RF tag may be damaged by distortion caused by a deformation of the tire 1, an impact on the tire 1, a vibration of the tire 1, or the like. Thus, in case where an RF tag is used, an impact or vibration from the tire inner surface side of the tire 1 is preferably absorbed by the first sound damping 3a to reduce transmission of the impact, vibration, or the like to the RF tag.

Figure 5:
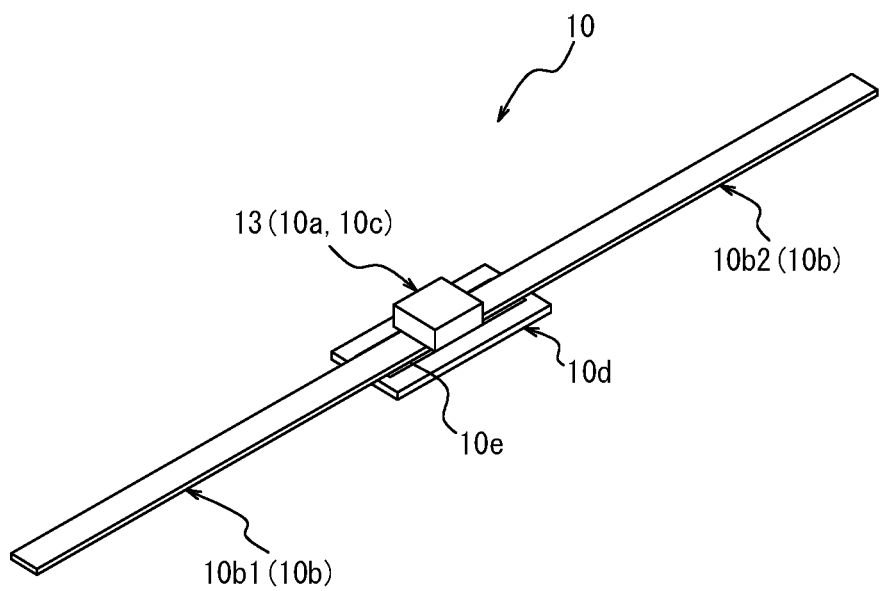
FIG. 5 is a perspective diagram illustrating the RF tag serving as a communication device illustrated in FIG. 4.
Figure 6:
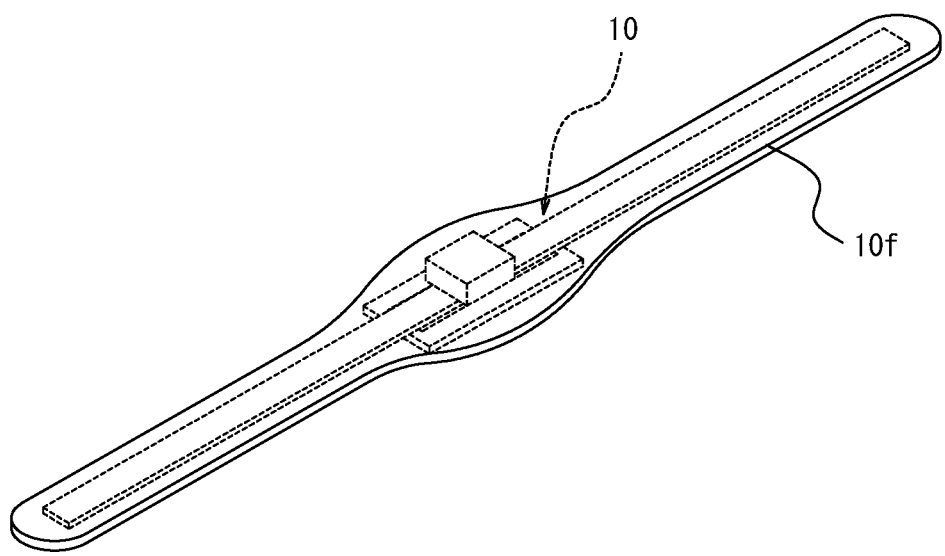
FIG. 6 is a perspective diagram illustrating the RF tag serving as a communication device illustrated in FIG. 5 that is covered with a covering portion.

FIGS. 5 and 6 are perspective diagrams illustrating an RF tag serving as the communication device 10 of the present embodiment. As illustrated in FIG. 5, the RF tag serving as the communication device 10 of the present embodiment includes a first antenna 10b1 and a second antenna 10b2 configuring the antenna unit 10b, an IC chip 13 configuring a control unit 10c and a storage unit 10a that are driven by an electric power induced by a radio wave received at the first antenna 10b1 and the second antenna 10b2, a plateshaped supporting member 10d to which the IC chip 13 is attached, and a conductive member 10e that electrically connects the IC chip 13 with each of the first antenna 10b1 and the second antenna 10b2. FIG. 6 is a perspective diagram illustrating the RF tag serving as a communication device 10 illustrated in FIG. 5 that is covered with a cover 10f. The cover 10f is made of a rubber or a resin. In the present embodiment, the RF tag serving as the communication device 10, which is covered with the cover 10f as illustrated in FIG. 6, is retained between the first sound damper 3a and the second sound damper 3b.

The specific configuration for retaining the RF tag serving as the communication device 10 is not particularly limited, as long as the RF tag is retained between the first sound damper 3a and the second sound damper 3b. Hence, the communication device 10 may be sandwiched by the first sound damper 3a and the second sound damper 3, so as to be retained therebetween. Such a configuration can be achieved, for example, by fixing the first sound damper 3a and the second sound damper 3b at different positions that are apart from each other in the direction along the tire inner surface (the direction substantially equal to the tire width direction A in FIG. 3) in the tire widthwise cross-sectional view (see FIG. 3 etc.), and retaining the RF tag serving as the communication device 10 by sandwiching the RF tag by the first sound damper 3a and the second sound damper 3b at a location where neither the first sound damper 3a nor the second sound damper 3b is fixed. The RF tag serving as the communication device 10 is preferably fixed to at least one of the first sound damper 3a and the second sound damper 3b with an adhesive or the like. This can enhance the securement of the communication device 10. The RF tag serving as the communication device 10 of the present embodiment is fixed to the first sound damper 3a and the second sound damper 3b with an adhesive. In a configuration in which the communication device 10 is fixed to at least the first sound damper 3a, the communication device 10 is united with the first sound damper 3a. As a result, impacts, vibrations, and the like acting on the communication device 10 from the tire inner surface side while the tire rolls on the road surface are reduced by the first sound damper 3a at any time. Furthermore, in a configuration in which the communication device 10 is fixed not only to the first sound damper 3a but also to the second sound damper 3b, the communication device 10 is also united with the second sound damper 3b. This can prevent communication device 10 from repeatedly colliding with the second sound damper 3b due to impacts, vibrations, and the like while the tire rolls on the road surface. This can prevent damages to the communication device 10, thereby improving the enhancing of the communication device 10.

[First Sound Damper 3a and Second Sound Damper 3b]

Next, the configurations of the first sound damper 3a and the second sound damper 3b will be described in detail.

FIG. 7 is a cross-sectional diagram solely illustrating the tire 1 along the tire equator plane CL (hereinafter referred to as a "tire circumferential cross-sectional diagram"). As illustrated in FIG. 7, the first sound damper 3a and the second sound damper 3b of the present embodiment are band-shaped members extending along the entire tire circumference C, and have substantially the same cross-sectional outer shapes in the tire widthwise cross-sectional diagram (see FIG. 2, etc.) at any position in the tire circumferential direction C. The first sound damper 3a and the second sound damper 3b may be provided along only a part of the tire circumference C as long as the communication device 10 is retained therebetween. The first sound damper 3a and the second sound damper 3b, however, are preferably provided along the entire tire circumference C as in the present embodiment. Such a configuration can increase the volume of the sponge materials inside the tire cavity 101, thereby further reducing cavity resonance inside the tire cavity 101, as compared to a configuration in which the first sound damper and the second sound damper are provided along only a part of the tire circumference C.

In the present embodiment, each of the first sound damper 3a and the second sound damper 3b has a flat shape in the tire widthwise cross-sectional view (see FIG. 3 etc.).

The first sound damper 3a is fixed to the tread inner surface 31 of the tire inner surface, and has a flat shape (see FIG. 3 etc.) in which the maximum length W1 thereof in the direction along the tire inner surface (which substantially equals the maximum length in the tire width direction A in this embodiment) is greater than the maximum thickness T1 thereof in the orthogonal direction orthogonal to the tire inner surface (which substantially equals the maximum length in the tire radial direction B in this embodiment), in the tire widthwise cross-sectional view (see FIG. 3 etc.). Note that the thickness of the first sound damper 3a is defined by the length of the first sound damper 3a in the orthogonal direction orthogonal to the tire inner surface.

It is assumed that the maximum thickness T1 and the maximum length W1 of the first sound damper 3a described above are defined as those measured under a condition in which the first sound damper 3a and the second sound damper 3b are attached to a tire 1 and the tire 1 is not mounted on a rim (at normal temperature and under normal pressure). The maximum thickness T1 of the first sound damper 3a of the present embodiment ranges from 5 mm to 45 mm, for example.

More specifically, the first sound damper 3a of the present embodiment has an approximate rectangular cross-sectional outer shape in the tire widthwise cross-sectional view (see FIG. 3 etc.). The first sound damper 3a of the present embodiment includes, in the tire widthwise cross-sectional view (see FIG. 3 etc.), a fixed surface 3a1 that extends along the tire inner surface and is fixed to the tire inner surface, an internal surface 3a2 that is opposite to the fixed surface 3a1 and extends substantially parallel to the fixed surface 3a1 along the tire inner surface, and edge surfaces 3a3 that are continuous with the fixed surface 3a1 and the internal surface 3a2, are located on respective sides in the direction along the tire inner surface (the direction substantially equal to the tire width direction A in the present embodiment), and extend in the orthogonal direction orthogonal to the tire inner surface.

The second sound damper 3b is overlapped on the surface of the first sound damper 3a on the tire internal space 102 side. The second sound damper 3b has a flat shape in which the maximum length W2 thereof is greater than the maximum thickness T2 thereof in the tire widthwise cross-sectional view (see FIG. 3 etc.). As used herein, the thickness of the second sound damper 3b is defined by the length of the second sound damper 3b in the direction orthogonal to the part of the surface of the first sound damper 3a on the tire internal space 102 side on which the second sound damper 3b is overlapped. The maximum thickness T2 of the second sound damper 3b is defined by the maximum value of the length of the second sound damper 3b in the direction orthogonal to the part of the surface of the first sound damper 3a on the tire internal space 102 side on which the second sound damper 3b is overlapped (a part of the internal surface 3a2 in the present embodiment). Note that the maximum thickness T2 of the second sound damper 3b of the present embodiment is equal to the maximum length in the orthogonal direction orthogonal to the tire inner surface, and is substantially equal to the maximum length in the tire radial direction B. The length of the second sound damper 3b is defined by the length of the second sound damper 3b in the direction along the surface of the first sound damper 3a. The maximum length W2 of the second sound damper 3b is defined by the maximum value of the length of the second sound damper 3b in the direction along the surface of the first sound damper 3a. The maximum length W2 of the second sound damper 3b of the present embodiment is equal to the maximum length thereof in the direction along the tire inner surface, and is substantially equal to the maximum length in the tire width direction A.

Similarly to the maximum thickness T1 and the maximum length W1 of the first sound damper 3a, it is assumed that the maximum thickness T2 and the maximum length W2 of the second sound damper 3b described above are defined as those measured under a condition in which the first sound damper 3a and the second sound damper 3b are attached to a tire 2 and the tire is not mounted on a rim (at normal temperature and under normal pressure).

The second sound damper 3b of the present embodiment covers at least a part of the internal surface 3a2 of the first sound damper 3a (only a part of the internal surface 3a2 in the present embodiment) in the tire widthwise cross-sectional view (see FIG. 3 etc.), and the RF tag serving as the communication device 10 is retained between the internal surface 3a2 of the first sound damper 3a and the second sound damper 3b. With such a configuration, the entire thickness of the first sound damper 3a can be employed to absorb impacts and vibrations coming from the tire inner surface side, thereby further enhancing the buffering capability to prevent transmissions of the impacts and vibrations from the tire inner surface side to the communication device 10 as compared to the configuration in which the communication device is retained between an edge surface 3a3 of the first sound damper 3a and the second sound damper 3b.

More specifically, the second sound damper 3b of the present embodiment has an approximate rectangular cross-sectional outer shape in the tire widthwise cross-sectional view (see FIG. 3 etc.). The second sound damper 3b of the present embodiment includes, in the tire widthwise cross-sectional view (see FIG. 3 etc.), an opposing surface 3b1 that faces the internal surface 3a2 of the first sound damper 3a and extends along the tire inner surface, a free surface 3b2 that is opposite to the opposing surface 3b1 and extends substantially parallel to the opposing surface 3b1 along the tire inner surface, and edge surfaces 3b3 that are continuous with the opposing surface 3b1 and the free surface 3b, are located on respective sides in the direction along the tire inner surface (the direction substantially equal to the tire width direction A in the present embodiment), and extend in the orthogonal direction orthogonal to the tire inner surface.

Here, in the present embodiment, the minimum thickness T3 of the first sound damper 3a is equal to or greater than the maximum thickness T2 of the second sound damper 3b. More specifically, the minimum thickness T3 of the first sound damper 3a of the present embodiment is greater than the maximum thickness T2 of the second sound damper 3b.

Increasing the minimum thickness T3 of the first sound damper 3a helps to prevent transmissions of impacts and vibrations from the tire inner surface side to the communication device 10 retained between the first sound damper 3a and the second sound damper 3b. On the other hand, it is sufficient for the second sound damper 3b to prevent small pieces of the broken sponge material from being detached from the surface of the sponge material, as long as the second sound damper 3b at least forms the surface of the sponge material facing the tire internal space 102. Thus, the maximum thickness T2 of the second sound damper 3b can be made small. As described above, it is desirable that the first sound damper 3a and the second sound damper 3b made of the sponge materials have their respective predetermined volumes or greater to achieve a desired cavity resonance reduction effect. Thus, the minimum thickness T3 of the first sound damper 3a equal to or greater than the maximum thickness T2 of the second sound damper 3b, together with the total thickness of the first sound damper 3a and the second sound damper 3b equal to or greater than a predetermined thickness for assuring a desired cavity resonance reduction effect can further improve the buffering capability to prevent transmissions of impacts and vibrations from the tire inner surface side to the communication device 10, and also provides both an improved securement of the communication device 10 by sponge materials and an improved durability of the sponge materials.

Note that the thickness of the first sound damper 3a of the present embodiment becomes the smallest where a recess 11 (described later) is provided, and is uniform at the location other than where the recess 11 is provided. Thus, the thickness of the first sound damper 3a at any location other than where the recess 11 is provided represents the aforementioned maximum thickness T1. In contrast, the thickness of the first sound damper 3a where the recess 11 is provided represents the aforementioned minimum thickness T3. In addition, since the thickness of the second sound damper 3b of the present embodiment is uniform, the thickness of the second sound damper 3b at any location represents the aforementioned maximum thickness T2.

Here, in the present embodiment, the maximum length W2 of the second sound damper 3b (which substantially equals the maximum length thereof in the tire width direction A in the present embodiment) is smaller than the maximum length W1 of the first sound damper 3a (which substantially equals the maximum length thereof in the tire width direction A in the present embodiment). More specifically, the second sound damper 3b of the present embodiment covers only a part of the internal surface 3a2 of the first sound damper 3a, and does not extend beyond the internal surface 3a2 of the first sound damper 3a in the direction along the tire inner surface in the tire widthwise cross-sectional view (see FIG. 3 etc.). In other words, the second sound damper 3b of the present embodiment extends only in the region where the internal surface 3a2 of the first sound damper 3a extends, in the direction along the tire inner surface in the tire widthwise cross-sectional view. The RF tag serving as the communication device 10 is retained at a position between the internal surface 3a2 of the first sound damper 3a and the opposing surface 3b1 of the second sound damper 3b.

Figure 8:
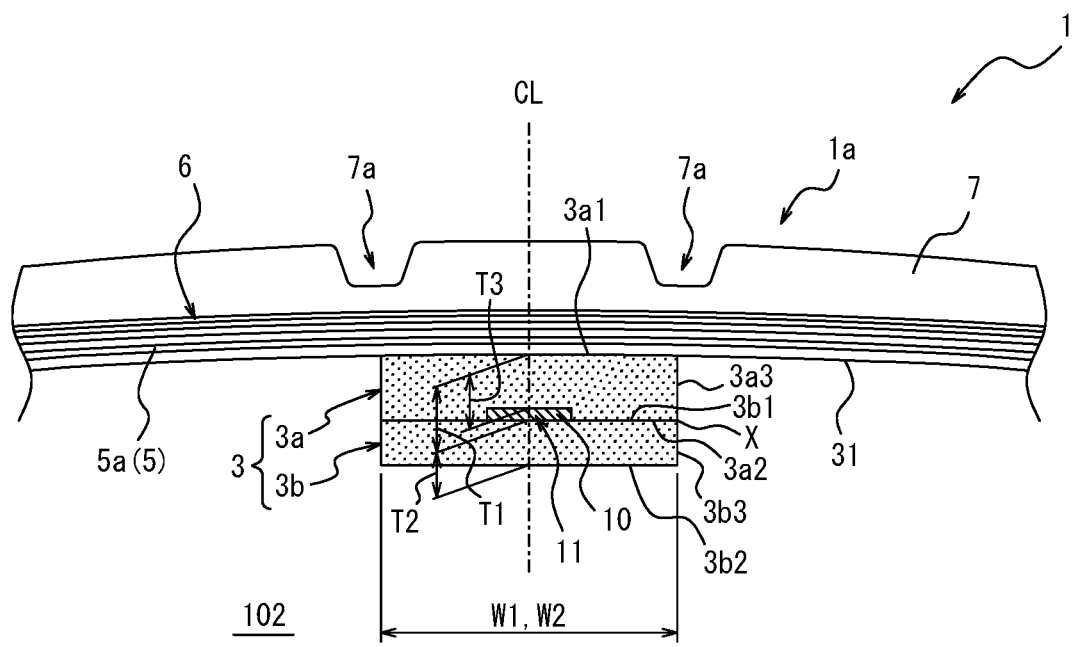
FIG. 8 is a diagram illustrating a variation to the sound damper illustrated in FIG. 3.
Figure 8:
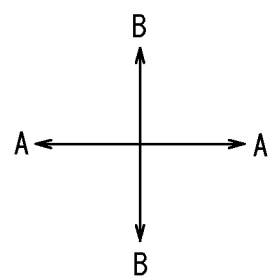
Figure 9:
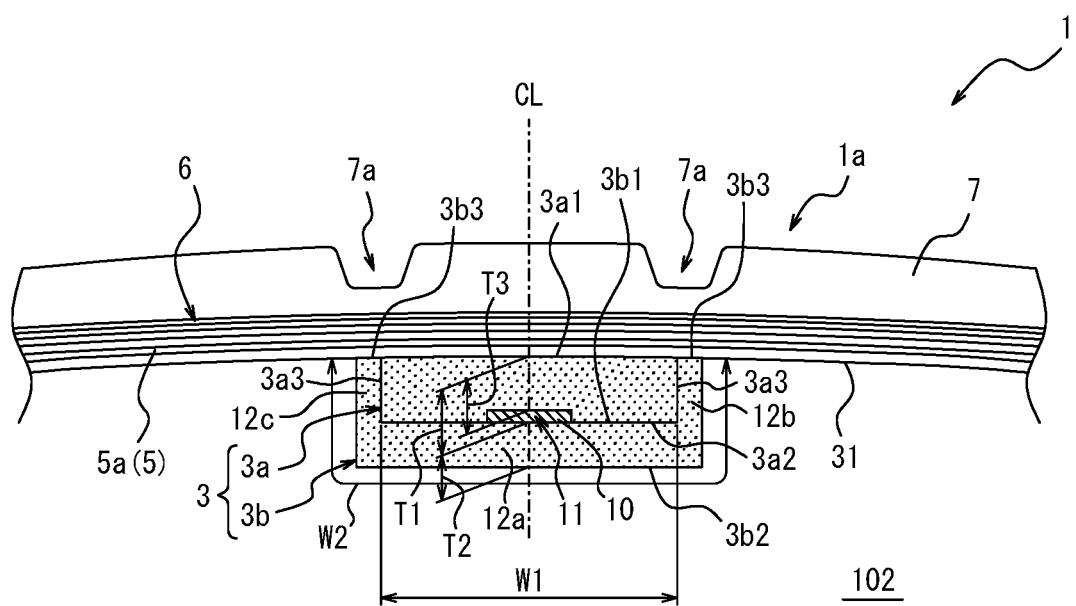
FIG. 9 is a diagram illustrating a variation to the sound damper illustrated in FIG. 3.
Figure 9:
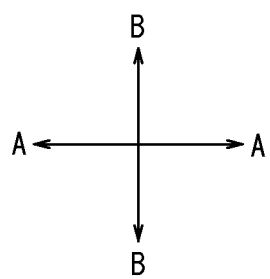

The length relationship of the maximum length W1 of the first sound damper 3a and the maximum length W2 of the second sound damper 3b is not limited to the above-described length relationship of the present embodiment. For example, as in variations illustrated in FIGS. 8 and 9, the maximum length W2 of the second sound damper 3b may be equal to or greater than the maximum length W1 of the first sound damper 3a. FIG. 8 illustrates a configuration in which the maximum length W2 of the second sound damper 3b is substantially equal to the maximum length W1 of the first sound damper 3a. FIG. 9 illustrates a configuration in which the maximum length W2 of the second sound damper 3b is greater than the maximum length W1 of the first sound damper 3a, so that the second sound damper 3b wraps around the edge surfaces 3a3 of the first sound damper 3a.

In other words, the second sound damper 3b illustrated in FIG. 8 covers the internal surface 3a2 of the first sound damper 3a entirely, and the RF tag serving as the communication device 10 is retained between the internal surface 3a2 of the first sound damper 3a and the opposing surface 3b1 of the second sound damper 3b, in the tire widthwise cross-sectional view. In this manner, the configuration in which the second sound damper 3b covers the internal surface 3a2 of the first sound damper 3a entirely in the tire widthwise cross-sectional view (see FIG. 8) can prevent deformations of the outer edges X of the internal surface 3a2 of the first sound damper 3a where small pieces of the broken sponge material is especially more likely to be detached, thereby preventing small pieces of the broken sponge material from being detached from the outer edges X of the internal surface 3a2 of the first sound damper 3a.

Alternatively, the second sound damper 3b illustrated in FIG. 9 covers at least a part of the edge surfaces 3a3 of the first sound damper 3a in the tire widthwise cross-sectional view. In other words, the second sound damper 3b illustrated in FIG. 9 covers not only the entire internal surface 3a2 but also at least a part of the edge surfaces 3a3, in the tire widthwise cross-sectional view. Such a configuration further reduces the area of the surface of the first sound damper 3a exposed to the tire internal space 102, as compared to the configuration in which the second sound damper 3b covers only the entire internal surface 3a2 as illustrated in FIG. 8. This can prevent small pieces of the broken sponge material from being detached from the surfaces of the first sound damper 3a more effectively.

More specifically, the second sound damper 3b illustrated in FIG. 9 covers the internal surface 3a2 and the edge surfaces 3a3 of the first sound damper 3a entirely, in the tire widthwise cross-sectional view. In other words, the entire tire internal space 102 side of the first sound damper 3a illustrated in FIG. 9 is covered with the second sound damper 3b. The second sound damper 3b illustrated in FIG. 9 contacts the tire inner surface at positions of the both sides of the first sound damper 3a in the direction along the tire inner surface, in the tire widthwise cross-sectional view (see FIG. 9). In the example illustrated in FIG. 9, the edge surfaces 3b3 of the second sound damper 3b contact the tire inner surface. In this manner, by covering the entire tire internal space 102 side of the first sound damper 3a with the second sound damper 3b, any surface of the first sound damper 3a exposed to the tire internal space 102 is eliminated. Since the entire surfaces on the tire internal space 102 side of the first sound damper 3a, where small pieces of the broken sponge material caused by deformation are more likely to be detached, are covered with the second sound damper 3b, it is possible to reduce detachment of the small pieces of the broken sponge material from the surface of the first sound damper 3a further more effectively.

Note that the second sound damper 3b illustrated in FIG. 9 includes, in the tire widthwise cross-sectional view, a first overlapping section 12a that is overlapped on the internal surface 3a2 of the first sound damper 3a, a second overlapping section 12b that is continuous with one end of the first overlapping section 12a and is overlapped on one edge surface 3a3 of the first sound damper 3a, and a third overlapping section 12c that is continuous with the other end of the first overlapping section 12a and is overlapped on the other edge surface 3a3 of the first sound damper 3a. The RF tag serving as the communication device 10 is retained between the internal surface 3a2 of the first sound damper 3a and opposing surface 3b1 of the second sound damper 3b on which the first overlapping section 12a extends.

Where the first overlapping section 12a extends, the thickness of the second sound damper 3b illustrated in FIG. 9 is defined by the length thereof in the direction orthogonal to the internal surface 3a2 (which equals the length in the orthogonal direction orthogonal to the tire inner surface, and substantially equals the length in the tire radial direction B, in the example of FIG. 9). Where the second overlapping section 12b and the third overlapping section 12c extend, the thickness of the second sound damper 3b illustrated in FIG. 9 is defined by the length thereof in the direction orthogonal to the edge surfaces 3a3 (which substantially equals the length in the tire width direction A in the example of FIG. 9). The maximum thickness T2 of the second sound damper 3b illustrated in FIG. 9 is defined by the thickness thereof where the first overlapping section 12a extends.

As described above, the RF tag serving as the communication device 10 of the present embodiment is fixed to the first sound damper 3a and the second sound damper 3b. More specifically, the RF tag serving as the communication device 10 of the present embodiment is fixed to the internal surface 3a2 of the first sound damper 3a and is also fixed to the opposing surface 3b1 of the second sound damper 3b with an adhesive. Furthermore, the first sound damper 3a of the present embodiment is fixed to the second sound damper 3b at two locations in the direction along the tire inner surface having the communication device 10 interposed therebetween, in the tire widthwise cross-sectional view (see FIG. 3 etc.). More specifically, in the present embodiment, the internal surface 3a2 of the first sound damper 3a and the opposing surface 3b1 of the second sound damper 3b are fixed to each other with an adhesive at the two locations interposing the communication device 10 in the tire width direction A, in the tire widthwise cross-sectional view (see FIG. 3 etc.). Such a configuration can, even when the adhesions between the communication device 10 and each of the first sound damper 3a and the second sound damper 3b are compromised, prevent the communication device 10 from displaced in a direction along the tire inner surface (which substantially equals the tire width direction A in the present embodiment), in the tire widthwise cross-sectional view (see FIG. 3 etc.). Thus, the communication device 10 is prevented from entering the tire cavity 101.

Additionally, each of the first sound damper 3a and the second sound damper 3b illustrated in FIGS. 3, 8, and 9 has a symmetrical shape with respect to the tire equator plane CL. Furthermore, the first sound damper 3a and the second sound damper 3b illustrated in FIGS. 3, 8, and 9 are provided only where the tread inner surface 31 extends, of the tire inner surface. In such a configuration, even when the tire 1 rotates at a high speed, the first sound damper 3a and the second sound damper 3b are pressed against the tread inner surface 31 by the centrifugal force acting outward in the tire radial direction B. This can effectively restrict any displacement of the first sound damper 3a and the second sound damper 3b. In other words, by fixing the first sound damper 3a and the second sound damper 3b on the tread inner surface 31, dislocations of the first sound damper 3a and the second sound damper 3b can be prevented with a smaller fixing force. Furthermore, since the RF tag serving as the communication device 10 is firmly retained between the internal surface 3a2 of the first sound damper 3a and the opposing surface 3b1 of the second sound damper 3b by the centrifugal force acting outward in the tire radial direction B, the securement of the communication device 10 during driving can be further improved.

Furthermore, in the examples illustrated in FIGS. 3, 8, and 9, a recess 11 is formed in the first sound damper 3a, and the RF tag serving as the communication device 10 is accommodated in the recess 11. More specifically, the recess 11 is formed in the internal surface 3a2 of the first sound damper 3a, and the RF tag serving as the communication device 10 illustrated in FIGS. 5 and 6 is accommodated in the recess 11 in the internal surface 3a2 of the first sound damper 3a. The rest of the internal surface 3a2 of the first sound damper 3a other than the recess 11 is brought into contact with the opposing surface 3b1 of the second sound damper 3b, and is fixed to the opposing surface 3b1 of the second sound damper 3b with an adhesive or the like. In this manner, a recess 11 that is formed in at least one of the first sound damper 3a and the second sound damper 3b and is capable of accommodating the communication device 10 prevents escape of the communication device 10 from the recess 11, and hence the securement of the communication device 10 can be further improved.

Note that the shape of the recess 11 for accommodating the communication device 10 is not limited to a groove that is wide and shallow, as the ones as illustrated in FIGS. 3, 8, and 9, and the recess 11 may have any of various shapes such as a narrow and deep slit groove, into which a thin communication device 10 can be inserted, for example.

In addition, note that, although the recess 11 is formed in the first sound damper 3a in the examples illustrated in FIGS. 3, 8, and 9, a recess 11 may be formed in the second sound damper 3b instead of the first sound damper 3a. Alternatively, respective recesses 11 may be formed in the first sound damper 3a and the second sound damper 3b. In this case, the first sound damper 3a and the second sound damper 3b are overlapped with one another such that that one cavity for accommodating the communication device 10 is defined by the recesses 11 in the first sound damper 3a and the second sound damper 3b. In other words, the RF tag serving as the communication device 10 is accommodated in so as to span both a recess 11 in the first sound damper 3a and a recess 11 in the second sound damper 3b.

Second Embodiment

Figure 10:
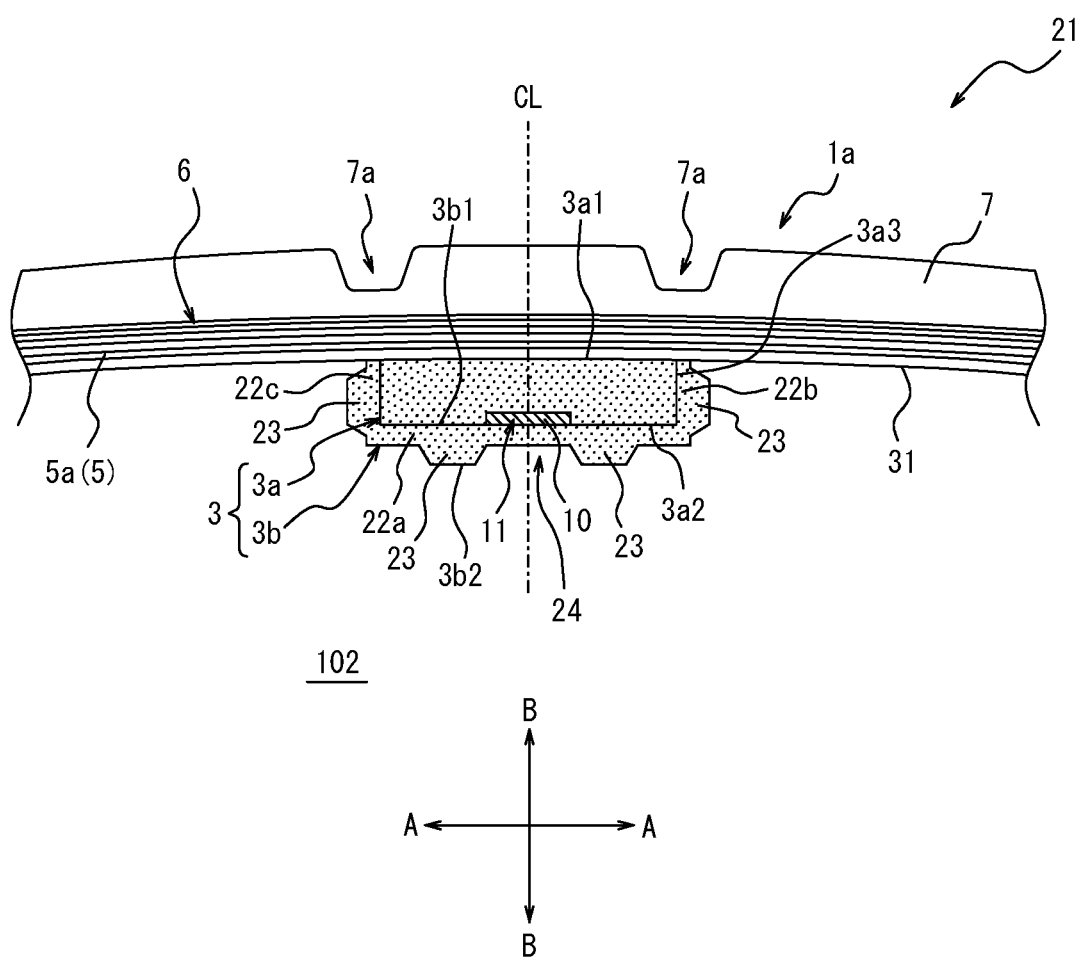
FIG. 10 is a tire widthwise cross-sectional diagram solely illustrating a pneumatic tire as a second embodiment of the present disclosure, illustrating a tread in an enlarged view.

Next, referring to FIG. 10, a pneumatic the tire 21 (hereinafter referred to as the "tire 21") as a second embodiment will be described. FIG. 10 is an enlarged cross-sectional diagram of a tread 1a in an enlarged view of the tire widthwise cross-section solely of the tire 21. Although the tire 21 of the present embodiment differs from the tire 1 of the aforementioned first embodiment in terms of the configuration of a second sound damper 3b, other configurations are the same. Hence, differences from the tire 1 of the first embodiment will be primarily described, and the descriptions on the same configurations are omitted.

In the present embodiment, the surface of the second sound damper 3b on the tire internal space 102 side has irregularities configured from protrusions and recesses. More specifically, the second sound damper 3b of the present embodiment includes, in the tire widthwise cross-sectional view (FIG. 10), a first overlapping section 22a that is overlapped on an internal surface 3a2 of a first sound damper 3a, a second overlapping section 22b that is continuous with one end of the first overlapping section 22a and is overlapped on one edge surface 3a3 of the first sound damper 3a, and a third overlapping section 22c that is continuous with the other end of the first overlapping section 22a and is overlapped on the other edge surface 3a3 of the first sound damper 3a. The surfaces of the second sound damper 3b on the tire internal space 102 side of the present embodiment define free surfaces 3b2, and the free surfaces 3b2 include the surface of the first overlapping section 22a on the inner side in the tire radial direction B, the surface of the second overlapping section 22b on one outer side in the tire width direction A, and the surface of the third overlapping section 22c on the other outer side in the tire width direction A. On the surface of the first overlapping section 22a on the inner side in the tire radial direction B serving as the surface of the second sound damper 3b on the tire internal space 102 side, two protruding ribs 23 as protrusions extending in the tire circumferential direction C (see FIG. 7) and a recessed groove 24 as a recess defined between the two protruding rib 23 are formed. Also on the surface of the second overlapping section 22b on the one outer side in the tire width direction A serving as the surface of the second sound damper 3b on the tire internal space 102 side, one protruding rib 23 is formed. Similarly, also on the surface of the third overlapping section 22c on the other outer side in the tire width direction A serving as the surface of the second sound damper 3b on the tire internal space 102 side, one protruding rib 23 is formed. In this manner, the irregularities formed on the surfaces of the second sound damper 3b on the tire internal space 102 side of the present embodiment are configured from the plurality of protruding ribs 23 and the recessed grooves 24 defined between the plurality of protruding ribs 23. In such a configuration, since sounds are more likely to be diffusely reflected by the irregularities on the surfaces of the second sound damper 3b on the tire internal space 102 side, cavity resonance can be reduced. Furthermore, since the surface area of the free surfaces 3b2 of the second sound damper 3b facing the tire internal space 102 is increased, the heat dissipation characteristic from the free surfaces 3b2 of the second sound damper 3b is enhanced.

The four protruding rib 23 of the present embodiment are arranged at intervals along the surface of the first sound damper 3a on the tire internal space 102 side, and each extend in the tire circumferential direction C (see FIG. 7), in the tire widthwise cross-sectional view (see FIG. 10). The present disclosure, however, is not limited to this configuration, and a plurality of protruding ribs 23 may be arranged at intervals in the tire circumferential direction C (see FIG. 7), and may each extend in the tire width direction A. Alternatively, protrusions may be arranged spaced apart in the tire width direction A and the tire circumferential direction C.

The pneumatic tire of the present disclosure is not limited to the specific configurations described in the embodiments and variations described above, and various modifications and changes can be made without departing from the scope of the claims.

INDUSTRIAL APPLICABILITY

The present disclosure relates to a pneumatic tire.

REFERENCE SIGNS LIST

1 Pneumatic tire
1a Tread
1b Side wall
1c Bead
2 Rim
2a Rim main body
2a1 Rim sheet
2a2 Rim flange 2*b* Disc
3 Sound damper
3*a* First sound damper
3*a*1 Fixed surface
3*a*2 Internal surface
3*a*3 Edge surface
3*b* Second sound damper
3*b*1 Opposing surface
3*b*2 Free surface
3*b*3 Edge surface
4 Bead member
4*a* Bead core
4*b* Bead filler
5 Carcass
5*a* Carcass ply
6 Belt
6*a* Inclined belt
6*a*1 First inclined belt layer
6*a*2 Second inclined belt layer
6*b* Circumferential belt
6*b*1 First circumferential belt layer
6*b*2 Second circumferential belt layer
6*b*3 Third circumferential belt layer
7 Tread rubber
7*a* Circumferential directional groove
8 Side rubber
9 Inner liner
10 Communication device
10*a* Storage unit
10*b* Antenna unit
10*b*1 First antenna
10*b*2 Second antenna
10*c* Control unit
10*d* Support member
10*e* Conducting member
10*f* Cover
11 Recess
12*a* First overlapping section
12*b* Second overlapping section
12*c* Third overlapping section
13 IC chip
21 Pneumatic tire
22*a* First overlapping section
22*b* Second overlapping section
22*c* Third overlapping section
23 Protruding rib
24 Recessed groove
31 Tread inner surface (tire inner surface)
32 Side wall inner surface (tire inner surface)
33 Bead inner surface (tire inner surface)
60 Reader/writer
60*a* Antenna unit
60*b* Control unit
100 Assembly
101 Tire cavity
102 Tire internal space
A Tire width direction
B Tire radial direction
C Tire circumferential direction
P1 and P2 Planes parallel to tire radial direction, intersecting outmost belt ends in width direction of belt
Q Belt end
T1 Maximum thickness of first sound damper
T2 Maximum thickness of second sound damper
T3 Minimum thickness of first sound damper
W1 Maximum length of first sound damper
W2 Maximum length of second sound damper
X Outer edge of internal surface of first sound damper
CL Tire equatorial plane

The invention claimed is:

1. A pneumatic tire comprising:
a first sound damper fixed to a tire inner surface and being made of a sponge material;
a second sound damper disposed on a tire internal space side of the first sound damper, and being made of a sponge material; and
a communication device retained between the first sound damper and the second sound damper,
wherein the second sound damper has a hardness greater than a hardness of the first sound damper, and
wherein the first sound damper and the second sound damper extend along an entire tire circumference.

2. The pneumatic tire according to claim 1, wherein
the second sound damper covers at least a part of an internal surface of the first sound damper in a tire widthwise cross-sectional view, the internal surface being opposite to a fixed surface that is fixed to the tire inner surface, and
the communication device is retained between the internal surface of the first sound damper and the second sound damper.

3. The pneumatic tire according to claim 2, wherein a minimum thickness of the first sound damper is equal to or greater than a maximum thickness of the second sound damper in the tire widthwise cross-sectional view.

4. The pneumatic tire according to claim 3, wherein the second sound damper covers the internal surface of the first sound damper entirely in the tire widthwise cross-sectional view.

5. The pneumatic tire according to claim 3, wherein the first sound damper is fixed to the second sound damper at two locations in the direction along the tire inner surface having the communication device interposed therebetween, in the tire widthwise cross-sectional view.

6. The pneumatic tire according to claim 2, wherein the second sound damper covers the internal surface of the first sound damper entirely in the tire widthwise cross-sectional view.

7. The pneumatic tire according to claim 6, wherein the second sound damper covers at least a part of edge surfaces of the first sound damper, the edge surfaces being continuous with the internal surface of the first sound damper and being located on two sides in a direction along the tire inner surface, in the tire widthwise cross-sectional view.

8. The pneumatic tire according to claim 7, wherein the second sound damper covers the internal surface and the edge surfaces of the first sound damper entirely, in the tire widthwise cross-sectional view.

9. The pneumatic tire according to claim 8, wherein the first sound damper is fixed to the second sound damper at two locations in the direction along the tire inner surface having the communication device interposed therebetween, in the tire widthwise cross-sectional view.

10. The pneumatic tire according to claim 7, wherein the first sound damper is fixed to the second sound damper at two locations in the direction along the tire inner surface having the communication device interposed therebetween, in the tire widthwise cross-sectional view.

11. The pneumatic tire according to claim 6, wherein the first sound damper is fixed to the second sound damper at two locations in the direction along the tire inner surface having the communication device interposed therebetween, in the tire widthwise cross-sectional view.

12. The pneumatic tire according to claim 2, wherein the first sound damper is fixed to the second sound damper at two locations in the direction along the tire inner surface having the communication device interposed therebetween, in the tire widthwise cross-sectional view.

13. The pneumatic tire according to claim 1, wherein a surface of the second surface damper on the tire internal space side is provided with irregularities.

14. The pneumatic tire according to claim 13, wherein the irregularities are configured from a plurality of protruding ribs extending in a tire circumferential direction and a recessed groove defined between the plurality of protruding ribs.

15. The pneumatic tire according to claim 1, wherein the communication device is fixed to at least one of the first sound damper and the second sound damper.

16. The pneumatic tire according to claim 1, wherein
at least one of the first sound damper and the second sound damper comprises a recess formed therein, and
the communication device is received in the recess.

17. The pneumatic tire according to claim 1, wherein the communication device is an RF tag.

18. A pneumatic tire comprising:
a first sound damper fixed to a tire inner surface and being made of a sponge material;
a second sound damper disposed on a tire internal space side of the first sound damper, and being made of a sponge material; and
a communication device retained between the first sound damper and the second sound damper,
wherein the second sound damper has a hardness greater than a hardness of the first sound damper,
wherein a surface of the second surface damper on the tire internal space side is provided with irregularities, and
wherein the irregularities are configured from a plurality of protruding ribs extending in a tire circumferential direction and a recessed groove defined between the plurality of protruding ribs.

19. The pneumatic tire according to claim 18, wherein
the second sound damper covers at least a part of an internal surface of the first sound damper in a tire widthwise cross-sectional view, the internal surface being opposite to a fixed surface that is fixed to the tire inner surface, and
the communication device is retained between the internal surface of the first sound damper and the second sound damper.

20. The pneumatic tire according to claim 19, wherein a minimum thickness of the first sound damper is equal to or greater than a maximum thickness of the second sound damper in the tire widthwise cross-sectional view.

* * * * *